United States Patent Office 2,771,495
Patented Nov. 20, 1956

2,771,495

DEHYDROALKYLATION OF UNSATURATED CYCLIC HYDROCARBONS

Herman Pines and Jerome A. Vesely, Evanston, Ill., assignors to Universal Oil Products Company, Des Plaines, Ill., a corporation of Delaware No Drawing. Application November 13, 1953,
Serial No. 392,046

13 Claims. (Cl. 260—668)

This invention relates to the dehydroalkylation of unsaturated cyclic hydrocarbons and more particularly to the simultaneous dehydrogenation and side chain alkylation of unsaturated cyclic hydrocarbons having an alkyl or alkenyl group attached to the cyclic hydrocarbon, said hydrocarbon containing at least two double bonds per molecule, at least one double bond being in the ring.

It is an object of this invention to provide a process for the dehydrogenation of a cyclic olefin containing an alkyl or alkenyl group attached to the ring and simultaneously alkylating said alkyl or alkenyl group.

A further object of this invention is to simultaneously dehydrogenate and alkylate an unsaturated cyclic hydrocarbon containing an alkyl or alkenyl group attached to the ring, in the presence of a catalyst comprising an alkali metal or hydride thereof and a compound capable of forming an organometallic compound.

One embodiment of this invention relates to a process for the dehydroalkylation of an unsaturated cyclic hydrocarbon containing a six-membered geminal carbon atom free ring by reacting said hydrocarbon with an aliphatic olefin in the presence of a catalyst comprising an alkali metal or hydride thereof.

Another embodiment of this invention relates to the dehydroalkylation of an unsaturated cyclic hydrocarbon containing a six-membered geminal carbon atom free ring and at least two double bonds per molecule, at least one of said double bonds being in said ring, said process comprising reacting said hydrocarbon with an aliphatic olefin under hydrogen transfer conditions in the presence of a catalyst comprising an alkali metal or hydride thereof and a compound capable of forming an organometallic compound.

A specific embodiment of this invention resides in the dehydroalkylation of an unsaturated cyclic hydrocarbon containing a six-membered geminal carbon atom free ring and at least two double bonds per molecule, at least one of said double bonds being in said ring, said hydrocarbon containing an alkyl or alkenyl group attached to said ring, said process comprising reacting said hydrocarbon with an aliphatic olefin in the presence of a catalyst comprising an alkali metal or a hydride thereof and a compound capable of forming an organometallic compound, under hydrogen transfer conditions.

A more specific embodiment of the invention is found in the dehydroalkylation of d-limonene which comprises reacting said limonene with an aliphatic olefin in the presence of a catalyst comprising an alkali metal or hydride thereof and a compound capable of forming an organometallic compound, under hydrogen transfer conditions.

A still more specific embodiment of the invention is found in the dehydroalkylation of d-limonene which comprises reacting said limonene with ethylene in the presence of a catalyst comprising sodium and o-chlorotoluene at temperatures ranging from 210° C. to 230° C.

Other objects and embodiments of the invention referring to alternative unsaturated cyclic hydrocarbons containing a six-membered geminal carbon atom free ring and to alternative catalysts will be referred to in the following further detailed description of the invention.

It has now been discovered that an unsaturated cyclic hydrocarbon containing a six-membered geminal carbon atom free ring containing at least two double bonds per molecule, at least one of said double bonds being in said ring and having an aliphatic substituent attached to said ring may be reacted with an aliphatic olefin in the presence of an alkali metal catalyst to give a simultaneous dehydrogenation of the ring and an alkylation of the side chain to form alkylated aromatic compounds. These alkylated aromatic compounds may be useful in the preparation of pharmaceuticals, resins, plastics and as intermediates for the preparation of other organic compounds.

Unsaturated cyclic hydrocarbons which may be used as starting materials in this process are those which do not contain a geminal carbon atom in the ring, that is, a quaternary carbon atom which does not have any hydrogen atoms attached thereto. This geminal carbon atom free ring is a necessary prerequisite to the hydrocarbon used, in order that the ring may be dehydrogenated to form an aromatic compound. For example, the process for the present invention will not take place if an unsaturated cyclic hydrocarbon containing a six-membered carbon ring such as 1,1,2,3-tetramethyl cyclohexadiene is used, due to the fact that one of the carbon atoms in the six-membered ring is a quaternary carbon atom (carbon atom No. 1 is connected to 4 other carbon atoms and does not have a hydrogen atom attached thereto). The preferred compounds which are used in the process of the present invention comprise unsaturated cyclic hydrocarbons containing a geminal carbon atom free ring, said hydrocarbon containing an alkyl or alkenyl group attached to the ring. The alkyl group can consist of either a straight chain or a cyclic radical. These compounds include cyclic diolefins which can undergo isomerization to shift one double bond from the alkyl or alkenyl group attached thereto to the ring. Therefore, it is possible by means of an intramolecular hydrogen transfer and dehydrogenation to form a substituted aromatic hydrocarbon, in which at least one of the saturated substituents is attached to the aromatic ring by a carbon atom containing at least one hydrogen atom.

Examples of these compounds include vinyl cyclohexene, allyl cyclohexene, propenyl cyclohexene, isopropenyl cyclohexene, butenyl cyclohexene, etc., 1,2-dimethyl cyclohexadiene, 1,3-dimethyl cyclohexadiene, etc., 1,2-diethyl cyclohexadiene, 1-methyl-2-ethyl cyclohexadiene, 1,3-diethyl cyclohexadiene, monocyclic terpenes such as di-limonene, terpionolene, α-terpinene, β-terpinene, γ-terpinene, α-phellandrene, β-phellandrene, the isomeric menthadienes, sylvestrene, carvestrene, menthene, etc.

Aliphatic olefins which may be used in this process include ethylene, propylene, butylene, amylene, etc., 1,3-propadiene, 1,3-butadiene, 1,3-pentadiene, 1,4-pentadiene, 2,4-pentadiene, etc., the preferred olefin for use as an alkylating agent being ethylene.

The simultaneous dehydrogenation and side chain alkylation of the present invention is carried out in the presence of catalysts including alkali metals and alkaline earth metals or their hydrides. For purposes of this invention the term "alkali metal" when pertaining to a catalyst, embraces both alkali metal and alkaline earth metals such as sodium, potassium, magnesium, lithium, strontium, rubidium, cesium, barium and calcium. The hydrides of these metals include calcium hydride, barium hydride, strontium hydride, lithium hydride, sodium hydride, potassium hydride, magnesium hydride, and mixtures thereof such as calcium lithium hydride, calcium barium hydride, lithium potassium hydride, sodium lithium hydride, etc. may also be used. Other metallic hydrides which may be used for catalysts in this reaction include aluminum hydride, or combinations of aluminum hydride with any of the aforeside alkali or alkaline earth metals including lithium aluminum hydride, calcium almuinum hydride, sodium aluminum hydride, etc. Metalloid hydrides such as boron hydride may also be used within the scope of the invention, although not necessarily with equivalent results. Combinations of catalysts containing dehydrogenation properties and side chain alkylations properties may also be used, such combinations including the combination of nickel and sodium, molybdenum oxide and sodium, chromium oxide and sodium, nickel and sodium hydride, nickel and potassium hydride, molybdenum oxide and potassium hydride, etc.

The reaction of the present invention is promoted by the addition of small amounts of compounds which are capable of forming an organometallic compound with the metallic catalyst during the reaction. The organic promoters which combine with a metal to form organometallic compounds include polynuclear aromatic hydrocarbons such as anthracene, dihydroanthracene, fluorene, phenanthrene, tetralin, and the like; heterocyclic compounds containing a ring consisting of a nitrogen atom and at least four but not more than five carbon atoms such as pyridine, picoline, and other alkyl pyridines, quinoline, isoquinoline, and various alkylated quinolines and isoquinolines, pyrrole, piperidine, etc.; organic peroxy compounds such as acetyl peroxide, benzoyl peroxide, di-t-butyl peroxide, t-butyl hydroperoxide, tetralin hydroperoxide, methyl cyclopentyl hydroperoxide, dimethyl cyclopentyl hydroperoxide, etc.; acetylenic compounds such as acetylene, methylacetylene, ethylacetylene, pentyne, hexyne, heptyne, etc.; halogenated aromatic compounds such o-chlorotoluene, o-bromotoluene, o-chloroethyl benzene, o-chloropropyl benzene, o-bromoethyl benzene, etc. In addition the catalyst may include a combination of an alkali metal or several alkali metals and at least one organometallic compound. The organometallic compounds which are useful in this process are reactive metal compounds in which a valence bond of the metal is combined directly with a carbon atom of a hydrocarbon radical. Organometallic compounds such as these include lead tetraalkyls, lead tetraryls, lead alkyl aryls, zinc aryls, mercury dialkyls and diaryls, tin tetralkyls, and the like. Alkyl metal halides such as alkyl lead chloride, phenyl mercury chloride, and like may also be used. In the present invention sodium and potassium are generally preferred due to the relatively lower cost and availability of these metals. The amount of the alkali metals and the organic promoter used will depend upon the particular unsaturated cyclic hydrocarbon and aliphatic olefin being reacted. In general an excess of alkali metals over the organic promoter is employed, thus insuring the presence of free metal as well as an organometallic salt.

Better contacting of the reactants and the catalysts and improved yields of the desired products are sometimes affected by use of a catalyst supporting or spacing material such as activated charcoal, granular coke, silica, alumina, pumice, porcelain, quartz, etc.; steel turnings, copper shot, etc. which do not have an adverse influence on the reaction but improve the mixing. Such spacing materials are useful in either batch type operation as in an autoclave or in continuous treatment in a tubular reaction or other suitable apparatus.

The process of this invention may be effected in any suitable manner and may be carried out using either batch or continuous type of operation and suitable equipment such as autoclaves or tubular reactors constructed from steel or glass lined steel reactors. The process is carried out at a temperature of from about 100° C. to about 350° C. or more, and preferably at temperatures ranging from about 150° C. to about 275° C., and at a pressure of from about atmospheric to about 100 atmospheres. When a batch type operation is used, a quantity of the starting materials, namely, the unsaturated cyclic hydrocarbons containing a six-membered geminal carbon atom free ring and at least two double bonds per molecule, one of said double bonds being in said ring, and the catalyst are placed in a reaction vessel equipped with a mixing device and gas inlet means. The cyclic hydrocarbon is then subjected to a stream of gaseous olefins while being heated and mixed. The amount of catalyst used in the process is dependent upon the nature and reactivity of the unsaturated cyclic hydrocarbon containing a six-membered geminal carbon atom free ring and upon the nature of the olefin used as a side chain alkylating agent. Also, the particular catalyst promoter has an influence upon the amount of the alkali metal necessary for efficient operation of the process. In general, from about 0.05 to about 0.5 atomic proportions of alkali metal is present per molecular proportion of unsaturated cyclic hydrocarbons present in the reaction zone. The aliphatic olefin may be introduced continuously or intermittently, the latter method being commonly employed in the usual type of batch operation conducted in an autoclave, so that the consumption of the aliphatic olefin can be followed by observing the decrease of operating pressure of the autoclave as the reaction progresses. After the reaction has reached the desired stage of completion, the reaction products are discharged from the autoclave, the unconverted aliphatic olefin being recovered for further use in the process or utilized for some other purpose. The mixture of reaction products is then subjected to suitable separation treatment such as filtration to remove unconsumed catalyst, followed by fractional distillation of the normally liquid product to separate the unconverted charge stock from the dehydrogenated and side chain alkylated product, and higher boiling material, the latter being sometimes formed as byproducts of the reaction.

Another method of operation of the present process is of a continuous type. A particularly suitable type of operation comprises a fixed bed type in which the catalyst is disclosed as a bed in a reaction zone provided with gas inlet means, and the unsaturated cyclic hydrocarbon containing a six-membered geminal carbon atom free ring is passed therethrough in either an upward or downward flow while being subjected to a continuous stream of aliphatic olefins gas. The unsaturated cyclic hydrocarbon may be heated while in the reaction zone or may be heated prior to admittance into said zone and kept at the desired temperature while therein. The reaction products are continuously discharged from the reaction zone and subjected to a separation treatment substantially the same as that hereinbefore described with reference to the batch type operation.

Another continuous type process is the fluidized type of operation in which the unsaturated cyclic hydrocarbon and the catalyst are maintained in a state of turbulence under hindered settling conditions in a reaction zone. Still other types of continuous processes include the compact moving bed type of operation in which the catalyst and the unsaturated cyclic hydrocarbon pass either concurrently or countercurrently to each other, and the slurry type process, in which the catalyst is carried into the reaction zone of the slurry in the unsaturated cyclic hydrocarbon. In each of the aforementioned types of processes the unsaturated cyclic hydrocarbon is subjected to the action of an aliphatic olefin continuously charged into said reaction zone. The unreacted unsaturated cyclic hydrocarbon containing a six-membered geminal carbon atom free ring may be separated out and recycled for use as a portion of the charge stock while the desired product is withdrawn and purified.

The following example is given to illustrate the process of the invention, which, however, is not intended to limit the generally broad scope of the present invention in strict accordance therewith.

EXAMPLE I 44 grams of d-limonene, 4 grams of sodium and 1 gram of o-chlorotoluene were heated at a temperature of 225° C. for a period of 3 hours in a rotating bomb in the presence of 30 atmospheres of ethylene. The reaction product was separated from the unconsumed sodium and was fractionally distilled to separate the unconverted d-limonene, and o-chlorotoluene. The liquid product recovered from the reaction was found to weigh 54.4 grams which corresponded to 5.5 grams of increase in weight. The liquid product was then subjected to fractional distillation, the results of which are found in the table below.

Table I

| Cut | Temp., ° C. | Cc. | G. | $N_D^{20}$ |
|---|---|---|---|---|
| 1 | 127–160 | 4.0 | 3.2 | 1.4710 |
| 2 | 160–185 | 16.0 | 13.3 | 1.4830 |
| 3 | 185–203 | 2.8 | 2.4 | 1.4840 |
| 4 | 203–207 | 7.2 | 6.0 | 1.4877 |
| 5 | 207–211 | 9.4 | 7.9 | 1.4903 |
| 6 | 211–220 | 5.0 | 4.4 | 1.4920 |
| 7 | 220–231 | 2.0 | 1.7 | 1.4905 |
| 8 | 231–234 | 1.3 | 1.1 | 1.4901 |
| Bottoms | | | 5.0 | |

Fractions 4 and 5 contain p-n-propyl-isopropyl benzene which was formed according to the following equation:

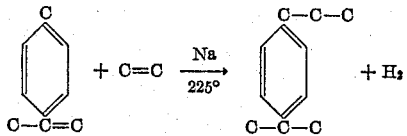

This indicated that a side chain alkylation of the d-limonene was accompanied by dehydrogenation.

We claim as our invention:

1. A process for the dehydroalkylation of an unsaturated cyclic hydrocarbon containing a six-membered geminal carbon atom free ring and at least two double bonds per molecule, at least one of said double bonds being in said ring, said hydrocarbon containing at least one substituent selected from the group consisting of alkyl and alkenyl radicals, attached to said ring which comprises reacting said hydrocarbon with an aliphatic olefin in the presence of a catalyst selected from the group consisting of alkali metals and hydrides thereof, under hydrogen transfer conditions.

2. A process for the dehydroalkylation of an unsaturated cyclic hydrocarbon containing a six-membered geminal carbon atom free ring and at least two double bonds per molecule, at least one of said double bonds being in said ring, and at least one hydrogen atom on the carbon atom on the ring which does not contain a double bond, said hydrocarbon containing at least one substituent selected from the group consisting of alkyl and alkenyl radicals, attached to said ring which comprises reacting said hydrocarbon with an aliphatic olefin in the presence of a catalyst selected from the group consisting of alkali metals and hydrides thereof and a compound capable of forming an organometallic compound, under hydrogen transfer conditions.

3. A process for the dehydroalkylation of an unsaturated cyclic hydrocarbon containing a six-membered geminal carbon atom free ring and at least two double bonds per molecule, at least one of said double bonds being in said ring, said hydrocarbon containing at least one substituent selected from the group consisting of alkyl and alkenyl radicals, which comprises reacting said hydrocarbon with an aliphatic olefin in the presence of sodium, under hydrogen transfer conditions.

4. A process for the dehydroalkylation of an unsaturated cyclic hydrocarbon containing a six-membered geminal carbon atom free ring and at least two double bonds per molecule, at least one of said double bonds being in said ring, said hydrocarbon containing at least one substituent selected from the group consisting of alkyl and alkenyl radicals, attached to said ring which comprises reacting said hydrocarbon with an aliphatic olefin in the presence of sodium hydride, under hydrogen transfer conditions.

5. A process for the dehydroalkylation of an unsaturated cyclic hydrocarbon containing a six-membered geminal carbon atom free ring and at least two double bonds per molecule, at least one of said double bonds being in said ring, said hydrocarbon containing at least one substituent selected from the group consisting of alkyl and alkenyl radicals, attached to said ring which comprises reacting said hydrocarbon with an aliphatic olefin in the presence of sodium and o-chlorotoluene, under hydrogen transfer conditions.

6. A process for the dehydroalkylation of an unsaturated cyclic hydrocarbon containing a six-membered geminal carbon atom free ring and at least two double bonds per molecule, at least one of said double bonds being in said ring, said hydrocarbon containing at least one substituent selected from the group consisting of alkyl and alkenyl radicals, attached to said ring which comprises reacting said hydrocarbon with ethylene in the presence of sodium and o-chlorotoluene, under hydrogen transfer conditions.

7. A process for the dehydroalkylation of d-limonene which comprises reacting said limonene with ethylene in the presence of sodium and o-chlorotoluene, under hydrogen transfer conditions.

8. A process for the dehydroalkylation of d-limonene which comprises reacting said limonene with ethylene in the presence of a catalyst consisting of sodium and o-chlorotoluene at temperatures ranging from about 100° C. to about 300° C.

9. A process for the dehydroalkylation of d-limonene which comprises reacting said limonene with ethylene in the presence of a catalyst consisting of sodium and o-chlorotoluene at temperatures ranging from about 210° C. to about 230° C.

10. The process of claim 1 further characterized in that said substituent is an alkenyl radical.

11. The process of claim 1 further characterized in that said cyclic hydrocarbon is a monocyclic terpene.

12. The process of claim 1 further characterized in that said cyclic hydrocarbon is a cyclohexene having an alkenyl substituent on the ring.

13. The process of claim 1 further characterized in that said cyclic hydrocarbon is a cyclohexadiene having an alkyl substituent on the ring.

References Cited in the file of this patent

UNITED STATES PATENTS

| 2,401,246 | Hull | May 28, 1946 |
| 2,448,641 | Whitman | Sept. 7, 1948 |
| 2,548,803 | Little | Apr. 10, 1951 |